May 3, 1932.   J. B. BENNETT   1,856,457
CLUTCH AND TRANSMISSION MECHANISM
Filed Dec. 24, 1928   2 Sheets-Sheet 1

INVENTOR
Jess B. Bennett
BY
Augustus B. Stoughton.
ATTORNEY.

WITNESS:
Rob R Kitchel

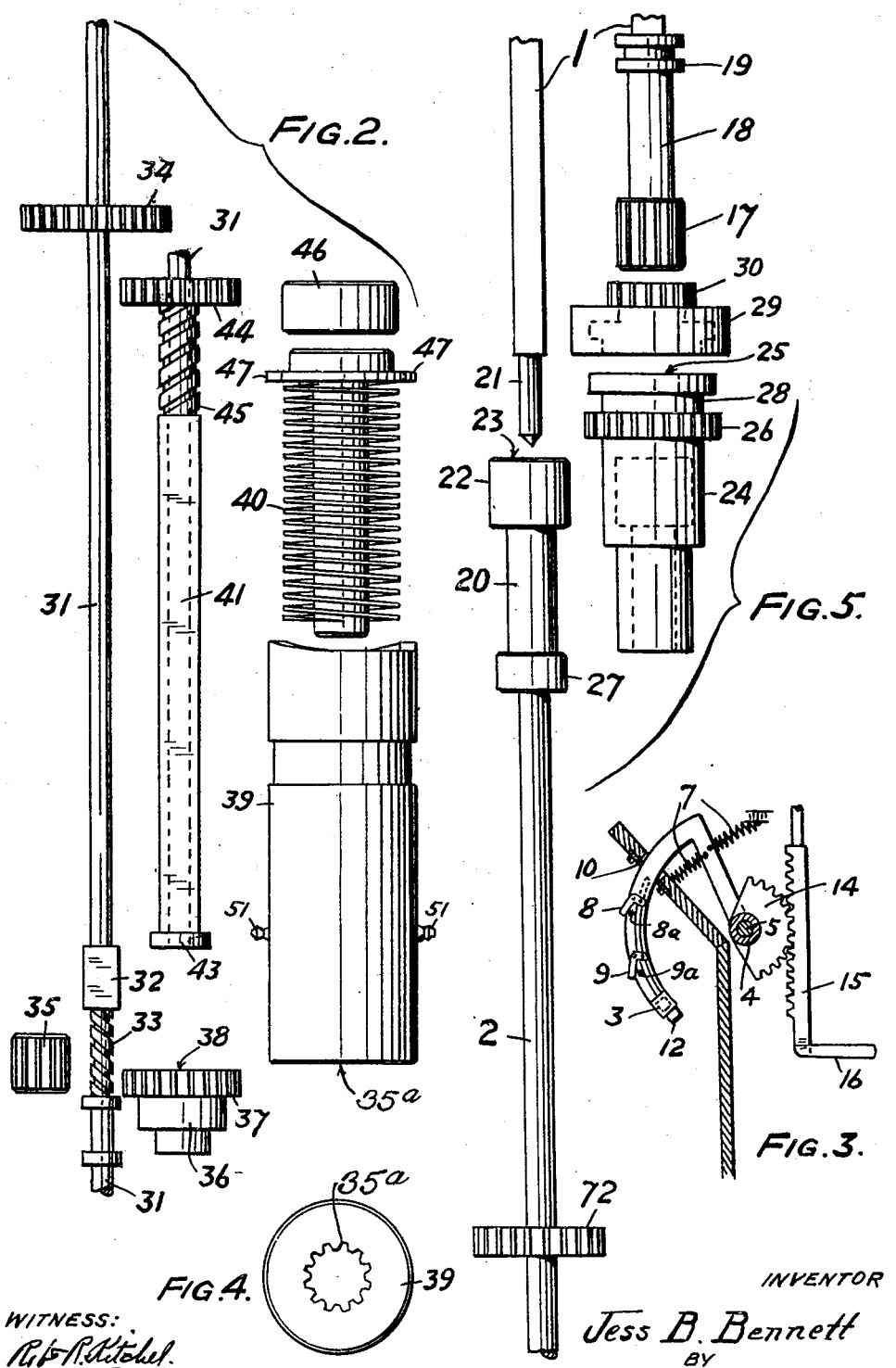

Patented May 3, 1932

1,856,457

UNITED STATES PATENT OFFICE

JESS B. BENNETT, OF RANCOCAS, NEW JERSEY

CLUTCH AND TRANSMISSION MECHANISM

Application filed December 24, 1928. Serial No. 328,071.

The object of my invention is to provide an improved and simplified transmission and clutching mechanism whereby rotary motion will be imparted gradually and noiselessly from the driving member to the driven member, and with the minimum requirement of gear shifting.

To these ends I have invented the device shown in the accompanying drawings, which I will describe in the following specification and the novel features of which I will set forth in the appended claims.

In the accompanying drawings,

Figure 2 is an exploded view showing the hydraulic mechanism and gears actuating it.

Figure 3 shows the gear shifting device consisting of the foot pedal, pinion, rack and shifter fork.

Figure 4 is an end view of cylinder 39.

Figure 5 is an exploded view of the variable gears and shafts.

In these figures, like parts are designated by like numbers.

Figure 1:
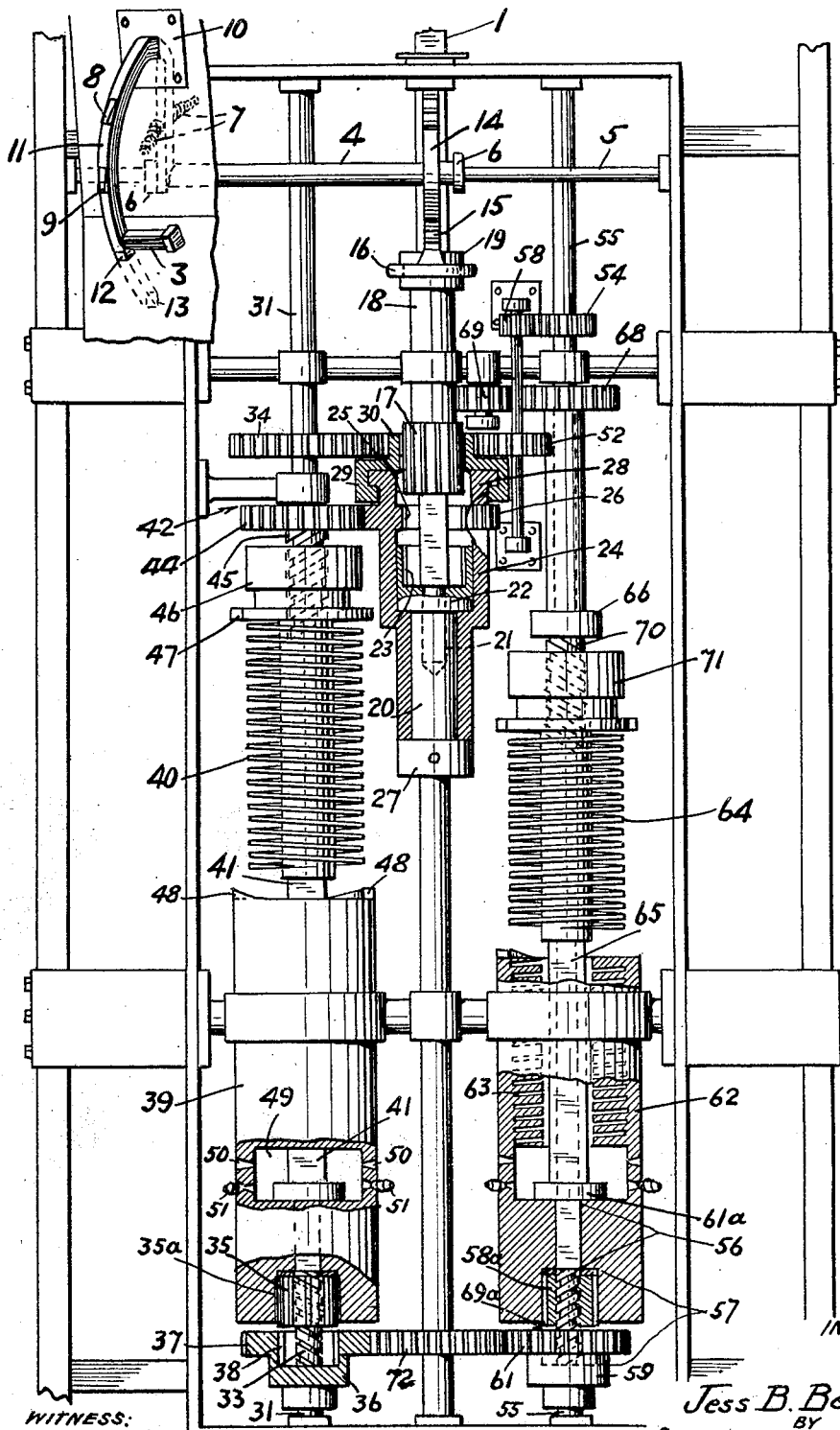
Figure 1 is a plan view of the mechanism as it would appear in place in an automobile.

In Figure 1, shaft 1 leads to the flywheel and is a prolongation of the main crank shaft driven by the motor. Shaft 2 leads back to the universal joint which transmits power to the driving wheels of the car.

Three (3) is a foot lever attached to a cylindrical sleeve 4 rotatable on shaft 5—5 and held in place by collars 6—6. This foot lever is held in the neutral position by springs 7 and, when pushed forward may be locked in one of two positions as soon as either ratchet 8 or 9 is depressed beneath floor plate 10. Ratchets 8 and 9 depress springs 8a and 9a (see Fig. 3) when pushed against plate 10 which springs force them out into locking position once the ratchets are beneath this plate. Both ratchets can be depressed flush with the upper face 11 of the foot lever 3 by pushing in the plunger 12. This plunger is curved to correspond to the curve of the foot lever, inserted in it and so attached to ratchets 8 and 9 (see Fig. 3) that the ratchets are released from the plate 10 by depressing the plunger 12. The ratchets 8 and 9 are L shaped, pivoted to permit depression (against springs 8a and 9a) and release. The foot lever 3 may also be pushed downward and backward to position 13.

Sleeve 4 is keyed to its pinion gear 14 (see Fig. 3) which meshes with rack 15 which rack extends to form shifter fork 16. 17 is the combined clutch and gear member device keyed to the square shaft 1—1 so that it will revolve with shaft 1—1 yet can be moved horizontally by shifter fork 16. The enlarged portion 19 of sleeve 18 has a groove around its circumference (see Fig. 5) to permit the shifter fork 16 to move freely in it so that any horizontal movement of the shifter fork will be imparted to the combined clutch and gear device (17—18—19), yet permit the combined clutch and gear device to revolve freely. Both ends of the teeth of combined clutch and gear 17 are tapered to permit easy meshing and quick disengaging with the intermediate, high and reverse gears which will be described later.

Shaft 2 is enlarged at its forward end first at 20 to strengthen it and to permit the cylindrical tapered end 21 of the shaft 1 to be housed within it thereby keeping the two sections 1 and 2 of the main shaft in alignment. Shaft 2 is enlarged again at 22 (see Fig. 5) which portion ends in a hollow cylinder internally geared with teeth 23 into which the combined clutch and gear 17 will mesh. Figure 1 shows a cross-section view of the intermediate gear cylinder 24 cut away at the forward end to show both the internal gear teeth 25 and the external gear teeth 26. Clutch gear 17 will mesh with the internal clutch member 25.

Twenty-nine (29) (see Fig. 5) is the neutral gear cylinder and is so recessed that it will fit rotatably on collar 28 (which is an extension of the intermediate gear cylinder 24). Gear 30 is attached to, and a part of, the neutral gear cylinder 29. It is externally geared to mesh with gear 34 and internally geared to mesh with combined clutch and gear 17.

The entire intermediate gear cylinder 24 (see Fig. 5) is housed loosely and rotatably around the enlarged cylindrical sections 20 and 22 of shaft 2. It is held in position by the rear face of the enlarged cylindrical section 22 and by the collar 27. The external gear teeth 26 mesh with gear 44 keyed to the intermediate sleeve 41. The cylindrical pusher device 46 is internally threaded to mesh loosely with external threads 45 which are cut into sleeve 41. 40 is a screw keyed to the square portion of sleeve 41. The square portion of sleeve 41 extends to point 43 (see Figs. 1 and 2).

Thirty-nine (39) is the clutch cylinder. It is internally threaded (as shown by the cut away portion 62 in Fig. 1) to accommodate screw 40 so that this screw may revolve freely within the clutch cylinder yet substantially fit fluid tight. This clutch cylinder is open at one end to permit the entrance of screw 40 and closed at the other end 43. 49 is an enlarged chamber at the closed end of the clutch cylinder with several adjustable outlet valves 51—51 and inlets 50—50. It is obvious that inlets 50—50 also act as outlets, but less efficiently (because of their funnel shape) than as inlets. The outer perimeter of the open end of the cylinder is curved out then recessed each 180° as illustrated at 48 so as to provide faces against which the dogs 47—47 will engage when screw 40 is completely screwed into the clutch cylinder 39.

Sixty-nine (69) is the reverse gear meshing with gear 68 which is keyed to the reverse counter shaft 65. On this reverse counter shaft is keyed a cylindrical pusher device 71, similar to the same device on the intermediate counter shaft except that the screws are threaded in the opposite direction and both screw and clutch cylinder are shorter because they must pick up a much smaller load.

The counter shaft gear 37 and the reverse counter shaft gear 61a mesh with the main shaft gear 72. Gear 30 on the neutral gear cylinder 29 meshes with gear 34 on the neutral counter shaft 31 (see Figs. 2 and 5). Intermediate sleeve 41 is hollow (see Fig. 2) to permit neutral counter shaft 31 to revolve inside it. The neutral counter shaft 31 is a round shaft and extends rearward to collar 43. It is then enlarged at point 32 (see Fig. 2). At 33 the shaft is screw threaded and next rearward are two collars (see Fig. 2) to hold intermediate gear 36 in place. Clutch 35 is internally screw threaded to mesh loosely with the screwed section 33 of shaft 31. It is externally geared to mesh with the internal gear teeth 38 of gear 36, and also with the internal gear teeth 35a (see Fig. 4) of cylinder 39.

Gear 30 likewise meshes with gear 52. Keyed to the same shaft is gear 58 which meshes with gear 54. Gear 54 is keyed to shaft 55 containing an enlarged section 56 and a screw threaded section 57 (with screw in opposite direction similar to shaft 31). Clutch 58a is internally screw threaded to fit loosely on the screw threaded section 57 of shaft 55. It is externally geared to mesh with the internal gear teeth in the end of cylinder 62, also to mesh with the internal gear teeth 69a in reverse gear 59.

The entire clutch and transmission mechanism contained within the tank illustrated is submerged in oil or similar liquid to provide lubrication, to quiet the gear shift, and to provide a cushioning force and the pressure necessary to operate the hydraulic clutch.

The operation of this clutch and transmission will now be fully described:

Once the motor is started, the main shaft 1 which extends as far as 21 starts revolving in a counter-clockwise direction. (Counter-clockwise when looking toward the front of the car.) Keyed to this main shaft is the combined clutch and gear device 17—18—19 (see Fig. 5) which starts to revolve with it. Since in the neutral position, the clutch and gear 17 meshes simultaneously with intermediate neutral gear 34 and reverse neutral gear 52, (through the medium of gear 30 the internal teeth of which mesh with combined clutch and gear 17 and the external teeth with gears 34 and 52), both the intermediate neutral mechanism and the reverse neutral mechanism start to revolve at the same time. For example, intermediate neutral gear 34 starts to revolve shaft 31 in a clockwise direction. The screwed portion 33 of this shaft (see Fig. 2) immediately forces clutch gear 35 back inside the open end 35a of cylinder 39 and disengages it (if it is engaged from internal threads 38 of intermediate gear 37) so that no motion is transmitted through the counter shaft back to the main shaft through gear 72.

The same operation (only in reverse direction) takes place through the reverse neutral gears 52, 58 and 54 which force clutch gear 58a back into a neutral position and out of mesh with internal clutch 69a of the reverse gear 61a. Whenever clutch gear 17 is in neutral position or is returned to neutral position, this same operation takes place.

To go into intermediate gear, foot lever 3 is depressed so that ratchet 8 locks beneath floor plate 10. This revolves pinion gear segment 14 and rack 15 which is a part of shifter fork 16 (see Fig. 3) toward the rear. The shifter fork pushes combined clutch and gear 17 horizontally along square shaft 1 until it meshes with internal clutch 25, and releases it from internal clutch 30 and the neutral mechanism. This causes gear 26 to revolve in a counter-clockwise direction and gear 44 to revolve in a clockwise direction. Pusher device 46 is moved rapidly to the rear because of screwed portion 45 of shaft 41. This force screw 40 (which is keyed to square sleeve 41) into screwed end of cylinder 39 (see cutaway portion of the reverse cylinder 62) and it starts screwing into the cylinder. Since this entire mechanism is under oil, this oil is immediately trapped in the cylinder 39 by screw 40, and the oil forced out rapidly through openings 50 and 51. However this liquid cannot escape as rapidly as this screw is attempting to enter the cylinder thereby exerting a pressure against the incoming screw and forcing it back against the screw faces of the cylinder 39. Since screw 40 is, at the same time, revolving, this pressure causes it to transmit gradually its rotary motion to the outside cylinder 39 until its full motion is acquired through the direct contact of dogs 47 with faces 48 when the screw has made its way completely inside of cylinder 39.

Once combined clutch and gear 17 disengages itself from the neutral mechanism, shaft 31 starts to slow down. Consequently, even before the screw 40 is positively engaged with outside cylinder 39, this outside cylinder is revolving at a faster rate of revolution than shaft 31. Because of the screwed portion 33 of shaft 31 and because clutch 35 is meshed at 35a (see Fig. 2) with outside cylinder 39, the now greater rate of revolution of cylinder 39, causes clutch 35 to be translated quickly to the rear where it engages and meshes with internal threads 38. Through the external gear 37, the rotary motion of cylinder 39 is then transmitted to the main shaft through gear 72, and through shaft 2 back to the rear wheels.

To go into high gear, foot lever 3 is next pushed forward until ratchet 9 locks itself in floor plate 10. Through the rack and pinion device, the shifter fork then pushes the main combined clutch and gear 17 back so that it engages with internal gear 23, at the same time retaining its mesh with the intermediate internal gear 25. This makes a direct connection with the front portion 1 of the main shaft and the rear portion 2, thereby delivering power in a direct line from the engine to the rear wheel.

At the same time, gear 72 (because of its gear ratio) starts revolving gear 37 (which is then meshed to outside cylinder 39) faster than the inside screw 40 is being revolved by gear 44. This causes the cylinder 39 to unscrew itself from the screw 40, forcing screw 40 back outside the cylinder to its original position.

By pushing foot lever 3 downward and backward to position 13, the shifter fork pulls the combined clutch and gear 17 forward along shaft 1 until it engages with reverse idler gear 69, and disengages itself with reverse neutral gear 52. This causes the entire reverse mechanism and the reverse neutral mechanism to go through the same operations as just described for the intermediate countershaft, except in the opposite direction.

I claim:

1. A power transmitting mechanism comprising in combination a driving shaft, a driven shaft, and interposed therebetween a driven member and a screw threaded driving member, means for driving the driving member from the driving shaft so as to go into screw threaded engagement with said driven member, said driven member having an opening therein which is screw threaded to receive said driving member and having ports leading therefrom which are adapted to permit the escape of an incompressible fluid trapped in said opening by said driving member, and means for driving said driven shaft from said driven member.

2. A power transmitting mechanism comprising in combination a driving shaft, a clutch and gear member mounted so as to be longitudinally slidable thereon but keyed to said shaft to rotate therewith, a neutral gear adapted to be driven from said sliding clutch and gear, a counter gear adapted to be driven from said sliding clutch and gear, a counter shaft having a gear thereon adapted to be driven from said neutral gear, a sleeve on said counter shaft having a gear thereon adapted to be driven from said counter gear, a screw threaded driving member movable on said sleeve keyed thereto to rotate therewith, a driven cylinder having an opening therein screw threaded to receive said driving member so as to trap an incompressible fluid therebetween and having ports therein which permit the escape of an incompressible fluid trapped in said opening between said driving member and said driven cylinder, said driven cylinder being adapted to engage with a clutch, a screw threaded portion on said counter shaft, a clutch in engagement therewith and having outer teeth which engage with the driven cylinder, a gear rotatably mounted on said counter shaft and adapted to engage said clutch, said gear having engagement with a gear on a driven shaft, and a driven shaft.

3. A power transmitting mechanism comprising in combination a driving shaft, a driven shaft, a screw threaded driving member, a cooperating screw threaded driven member, means including as a part thereof a slidable clutch and gear member and a gear connected to said driving member for driving said driving member from said driving shaft so as to move into fluid-tight screw threaded engagement with said driven member so as to trap an incompressible fluid between them, means for permitting escape of said incompressible fluid from said driven member, means for connecting said driven shaft to said driven member, a second screw threaded driving member, means including a slidable clutch and gear member and a gear connected to said second driving member for driving said second driving member from the driving shaft in the opposite direction to that of the first driving member, a second driven member having screw threaded engagement with said second driving member, and means to drive the driven shaft from the second mentioned driven member in a reverse direction to that which it is driven from the first mentioned driven member.

4. A power transmitting mechanism comprising in combination a driving shaft, a driven shaft, and interposed therebetween a screw threaded driving member, an open-end coaxial screw threaded driven member, means for driving the driving member from the driving shaft and causing it to go into substantially liquid-tight screw threaded engagement with said coaxial screw threaded driven member, said driven member being adapted to receive an incompressible fluid which, when substantially trapped by the entrance of said screw threaded driving member, sets up a resistance against the further entrance of said screw threaded driving member thereby causing part of the rotational movement of the driving member to be transmitted frictionally to the driven member, and means for driving the driven shaft.

5. A power transmitting mechanism comprising in combination a driving shaft, a driven shaft, and interposed therebetween a screw threaded driving member, an open-end coaxial screw threaded driven member, means for driving the driving member from the driving shaft and causing it to go into substantially liquid-tight screw threaded engagement with said coaxial screw threaded driven member, said driven member being adapted to receive an incompressible fluid which, when substantially trapped by the entrance of said screw threaded driving member, sets up a resistance against the further entrance of said screw threaded driving member, and means controlling the gradual escape of said trapped incompressible liquid from said driven member so as to permit the gradual entrance of said screw threaded driving member until a direct positive driving contact is made between the driving member and the driven member.

6. A power transmitting mechanism comprising in combination a driving shaft, a driven shaft, and interposed therebetween a screw threaded driving member, an open-end coaxial screw threaded driven member, means for driving the driving member from the driving shaft and causing it to go into substantially liquid-tight screw threaded engagement with said coaxial screw threaded driven member, said driven member being adapted to receive an incompressible fluid which, when substantially trapped by the entrance of said screw threaded driving member, sets up a resistance against the further entrance of said screw threaded driving member thereby causing part of the rotational movement of the driving member to be transmitted frictionally to the driven member, and means for establishing direct positive contact between the driving member and the driven member when the said driving member has completed its entrance into the said screw threaded driven member, which in turn drives the driven shaft.

7. A power transmitting mechanism comprising in combination a driving shaft, a driven shaft, and interposed therebetween a screw threaded driving member, an open-end coaxial screw threaded driven member, means for driving the driving member from the driving shaft and causing it to go into substantially liquid-tight screw threaded engagement with said coaxial screw threaded driven member, said driven member being adapted to receive an incompressible fluid which, when substantially trapped by the entrance of said screw threaded driving member, sets up a resistance against the further entrance of said screw threaded driving member thereby causing part of the rotational movement of the driving member to be transmitted frictionally to the driven member, means for establishing direct positive contact between the driving member and the driven member when the said driving member has completed its entrance into the said screw threaded driven member, means for driving the driven shaft from the driven member, and means for unscrewing said screw threaded driving member from said screw threaded driven member, thereby returning it to its original neutral position.

JESS B. BENNETT.